April 5, 1966  O. G. MOLINA  3,243,876
RESOLVING METHOD

Original Filed Jan. 29, 1962  8 Sheets-Sheet 1

INVENTOR.
ORLANDO G. MOLINA
BY
ATTORNEY

April 5, 1966     O. G. MOLINA     3,243,876
RESOLVING METHOD Original Filed Jan. 29, 1962     8 Sheets-Sheet 2

*INVENTOR.*
ORLANDO G. MOLINA
BY

ATTORNEY

April 5, 1966  O. G. MOLINA  3,243,876
RESOLVING METHOD

Original Filed Jan. 29, 1962　　　　　　　　　8 Sheets-Sheet 3

FIG. 5

INVENTOR.
ORLANDO G. MOLINA
BY

ATTORNEY

April 5, 1966     O. G. MOLINA     3,243,876

RESOLVING METHOD

Original Filed Jan. 29, 1962     8 Sheets-Sheet 4

FIG. 6

INVENTOR.
ORLANDO G. MOLINA

BY

ATTORNEY

April 5, 1966  O. G. MOLINA  3,243,876
RESOLVING METHOD

Original Filed Jan. 29, 1962  8 Sheets-Sheet 5

INVENTOR.
ORLANDO G. MOLINA

BY

ATTORNEY

April 5, 1966   O. G. MOLINA   3,243,876
RESOLVING METHOD

Original Filed Jan. 29, 1962   8 Sheets-Sheet 6

*INVENTOR.*
ORLANDO G. MOLINA

BY

ATTORNEY

April 5, 1966 O. G. MOLINA 3,243,876
RESOLVING METHOD

Original Filed Jan. 29, 1962 8 Sheets-Sheet 7

INVENTOR.
ORLANDO G. MOLINA
BY 
ATTORNEY

*INVENTOR.*
ORLANDO G. MOLINA

ATTORNEY

United States Patent Office 3,243,876
Patented Apr. 5, 1966

3,243,876
RESOLVING METHOD
Orlando G. Molina, Hawthorne, Calif., assignor to North American Aviation, Inc.
Original application Jan. 29, 1962, Ser. No. 169,553. Divided and this application Apr. 6, 1964, Ser. No. 361,927
1 Claim. (Cl. 29—407)

This application is a division of application Serial No. 169,533, filed Jan. 29, 1962, titled "Resolving Method and Means."

This invention concerns method of resolving physical, metallurgical, and stress configurations in structures which cannot be discerned by the normal visual process. More particularly, the invention contemplates an improved technique useful in defining subsurface, microscopic or otherwise invisible structural changes and relationships such as required in fabrication, inspection and testing of metallic workpieces.

Although the invention is of wide applicability in resolving constituent parts, stresses and minute details in workpieces of different materials for any purpose whatsoever, it will be described herein by way of example in connection with the fabrication, inspection and testing of precipitation hardenable stainless steel workpieces of various different forms including sandwich-type panels used for skin surfaces on advanced supersonic aerial vehicles and missiles. In making such panels, slabs of honeycomb core material of thin metal foil are accurately cut to produce the necessary variation in core thickness throughout the panel, and are thereafter brazed to top and bottom metal panel face sheets having a thickness normally within the range from .007 to .125 inch. Lightweight panels such as described above are used extensively to form the external surfaces of vehicles of the stated type, the separate panel sections being welded together along their adjacent edges to form such surfaces. In the control of boundary layer airflow over some of the vehicle surfaces, depending upon their location thereon, it is occasionally necessary to perforate such panels with a plurality of tiny holes by drilling the same through the outermost panel face sheet whereby a hole is centered between the interstices of each cell in the honeycomb core material. Due to the extremely sensitive nature of the stated panels with respect to their complex internal structure and thin walled components, accurate location of each of the perforations is essential.

Moreover, the fabrication problems described herein are additionally complicated by the fact that new materials and alloys not heretofore known in the manufacture of conventional supersonic vehicles are used in the panels mentioned above. Illustrative of these materials is the alloy commonly designated PH15–7Mo, comprised of the following components:

Percent maximum:
  Carbon ............................... .09
  Manganese ............................ 1.00
  Phosphorous .......................... .04
  Sulphur .............................. .03
  Silicon .............................. 1.00
Percent:
  Chromium ............................. 14.00–16.00
  Nickel ............................... 6.5–7.5
  Molybdenum ........................... 2.00–3.00
  Aluminum ............................. .75–1.5
  Iron ................................. Balance While the stated precipitation hardenable alloys including PH15–7Mo provide great strength at elevated temperatures, such materials are characterized by a great propensity for crack propagation, resulting in an extreme sensitivity to minute notches, cuts or scratches on specimen surfaces or edges. Therefore, misalignment of the stated apertures whereby scratches or other damage to the honeycomb cell walls might be caused during the drilling operation must be assiduously avoided.

Of further significance in the fabrication of vehicles of the stated type is the fact that precipitation hardenable stainless steels derive their maximum strength from the hardening process which involves transformation of each metallic specimen from austenite to martensitic structure. Where such transformation is not uniform and complete in a workpiece, regardless of its form, the presence of veins or stratas of austenite in the workpiece constitute potential areas of failure when the finished part is subjected to severe structural loads and temperature extremes such as those encountered in the operation of vehicles of the stated type. Therefore, it is essential in the fabrication of such vehicles that accurate and inerrant means of detection be provided to resolve the precise metallurgical composition of the material in such workpieces whereby traces of metallurigcal structure other than martensite may be located and identified.

Of further importance in the problem situation discussed above, welding of extremely thin gauge sheet metal to join adjacent lightweight panels along their confronting edges presents formidable problems not heretofore encountered. As in welding generally, the puddle temperature is normally raised much higher than the melting point of the base metal, and some of the welding heat permeates the base metal surrounding the weld area. Changes such as expansion and shrinkage of the heat affected area normally result from the welding operation, as well as changes in physical properties such as strength and ductility. Moreover, metallurgical effects such as recrystallization and heat treatment occur due to the application of welding heat. Notable among the effects of such heat treatment, for example, is the annealing of workpiece material in the previously transformed martensitic structure of the workpiece, resulting in a highly deleterious effect on the physical strength thereof. Therefore, accurate and reliable detection of metallurgical effects such as those mentioned above, particularly with respect to residual stresses caused by shrinkage during cooling of molten metal in the area of the weld seam and by phase transformation of the granular structure in the base metal beyond the stated seam, are critically important.

In further connection with the metallurgical examination of workpieces, it is also necessary to determine that the machinability or the structural reliability of workpieces such as channel members, for example, has not been impaired by the metallurgical configuration of the billet from which the workpiece is fabricated. This examination normally entails polishing a cross-sectional cut through the channel, etching the polished surface, photographing the etched surface, and enlarging the photograph for detailed study. As applied to hardened steel workpieces, the stated process involves 4–6 hours of polishing in addition to the time required for the etching agent to act on the polished surface. The conventional method of metallurgical examination thus described is elaborate, costly and time consuming, hence is poorly suited for mass-production use.

Accordingly, it is a principal object in this case to provide improved method of accurately resolving metallurgical configurations in metallic specimens.

It is another object in this case to provide method as stated in the above object characterized by rapidity, economy, and non-destructive effect upon the specimen.

It is another object of this invention to provide improved method of accurately resolving stress configurations in metallic specimens.

It is a further object of this invention to provide improved method of accurately resolving granular configurations in metallic masses.

It is also an object in this case to provide method as set forth in these objects whereby a permanent record of the results from use thereof may be rapidly obtained.

It is another object in this case to provide improved method of rapid and repeated visual determination of stress patterns in metallic specimens continuously and simultaneously during actual loading thereof.

It is an additional object of this invention to provide improved method of delineation of internal structural details in non-destructive inspection of workpieces wherein such details are not discernible by the unaided vision.

It is also an object in this case to provide method as set forth in these objects applicable to inspection of workpieces of honeycomb panel type having a relatively low density core affixed to relatively high density face sheets on either side thereof.

Other objects and advantages of the instant invention will become apparent upon a close reading of the following detailed description of an illustrative embodiment of the invention, reference being had to the accompanying drawings wherein.

Figure 1:
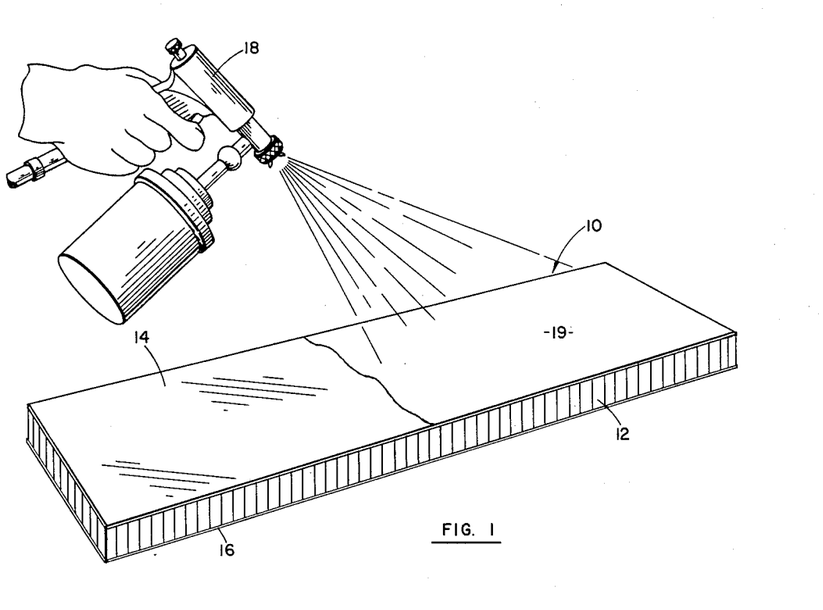
FIGURE 1 shows a general perspective view of a honeycomb panel workpiece being processed in accordance with the first step of the method disclosed herein.

Referring to the drawings described briefly above and particularly to FIGURE 1, it may be seen that the inventive method in this case may be practiced on a workpiece such as that generally designated by reference numeral 10 comprising a low density core of honeycomb material 12 brazed to upper and lower face sheets 14 and 16, respectively, of greater density than core 12. Workpiece 10 may form a surface member in a high speed aerial or space vehicle as discussed above, having thin walled construction of advanced alloy stainless steel material and characterized by extreme sensitivity to brazing heat. Since strong, uniform and continuous attachment of the core to the face sheet is essential, and depends upon effective distribution of brazing alloy to form fillets around each cell in the honeycomb core where the cell walls contact the face sheet, inspection of the finished panel is commensurately important to insure structural integrity in such vehicles. In the illustrative example of FIGURE 1, the novel method in this case as applied to inspection of workpiece 10 may begin by initially coating the workpiece with an opaque material which may take the form of a suitable quick-drying liquid applied to the workpiece by spraying, dipping or brushing. Where a workpiece surface is capable of being printed upon by the process described below due to inherent characteristics of the workpiece material, no separate coating step is necessary. The stated coating material, where necessary, may comprise any of several known paints, vinyls, or lacquers, preferably white, capable of being sprayed by use of an air hose attachment or spray gun as indicated at 18 in FIGURE 1. Illustratively, a mixture of 19.1% vinyl chloride resin, 61.4% aromatic solvents, 14.1% ketones, and 5.4% plasticizers with added pigment of desired color has been found advantageous.

Figure 2:
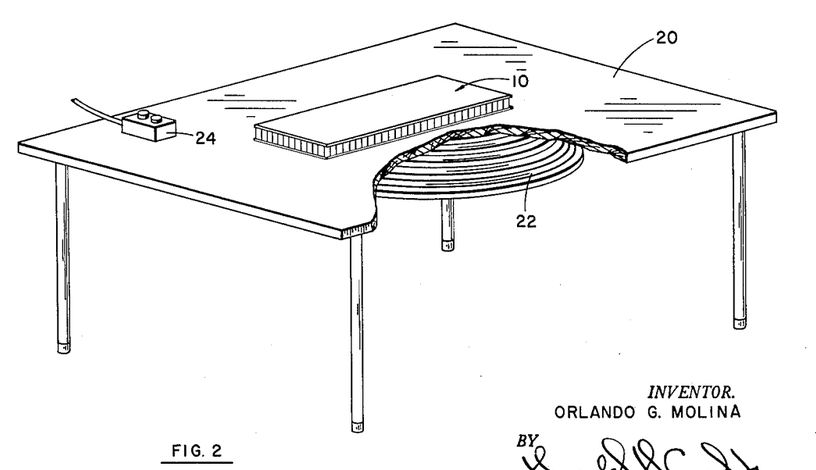
FIGURE 2 shows a general perspective view of the workpiece of FIGURE 1 positioned over a coil for passing a magnetic field through the workpiece.

After the coating material described above has dried completely, forming a layer 19 upon which printing may be accomplished, workpiece 10 may then be placed in close proximity with a suitable source of magnetic force whereby a magnetic field may be directed through the workpiece. Thus, for example, support means in the form of a table 20 may be provided as shown in FIGURE 2 for supporting workpiece 10 in a stationary condition and in close proximity with a generally flat coil 22 affixed or otherwise supported on table 20. Electrical controls of conventional type may be arranged as indicated at 24 for connecting coil 22 with a suitable source of power to initiate or terminate the magnetic action of the coil with respect to workpiece 10. In connection with placement of the workpiece, it is an important feature of the novel method disclosed herein that the lines of flux resulting from energization of coil 22 or other magnetic source occur in a direction whereby the lines penetrate the coated surface of workpiece 10 and are not parallel to the stated surface, with best results achieved when the stated lines are generally perpendicular to the coated surface.

Figure 5:
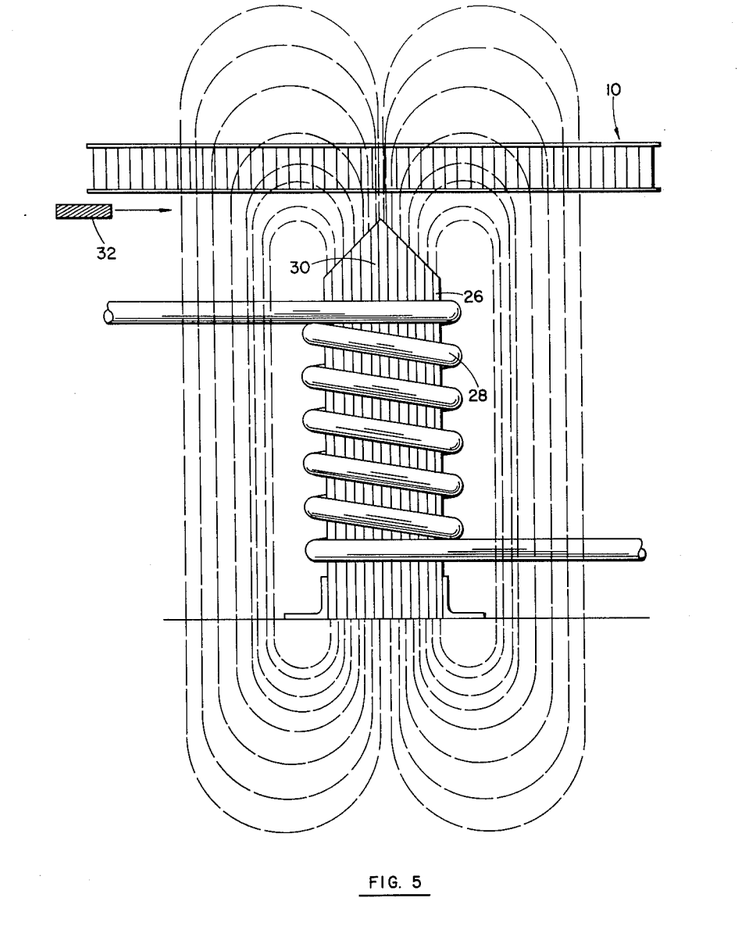
FIGURE 5 shows a schematic view in cross section taken through a coil having an iron core to produce an oriented and intensified magnetic field through the panel workpiece of FIGURES 1 through 4.

Following the initial steps discussed above, the surface of workpiece 10 upon which printing is to occur is sprinkled with a paramagnetic particulate, or minute filings from a suitable material responsive to magnetic force and inherently capable of marking the coated surface of the workpiece when rapidly impinged thereagainst in a vibratory manner under the action of the discontinuous magnetic field. Alternatively, the particles may be mixed with a suitable printing agent either in liquid or powdered form. For example, particles of iron oxide ($Fe_2O_3$) having a reddish color have been found to produce acceptable results in practicing the novel method disclosed herein. The magnetically responsive particles may be permanently magnetic or not, and either paramagnetic or diamagnetic. After dusting the workpiece with the particulate discussed above in connection with FIGURE 3, or else simultaneously with the dusting thereof, workpiece 10 is exposed to a magnetic field of varying intensity such as produced by alternating current or pulsating direct current. Use of appropriate switch means or of alternating current to power an electromagnet is advantageous in that a periodic reversal in the direction of magnetic force results, whereby the particles mentioned above are violently impinged against the surface of workpiece 10. In any case, the general direction of the lines of flux should pass generally vertically through the panel as indicated, for example, by FIGURE 5, or should otherwise penetrate the coated surface of workpiece 10. In connection with the stated properties of the magnetic field in respect of workpiece 10, the use of a core within an elongate coil arranged in the manner indicated by FIGURE 5 has been found advantageous in practicing the novel method discussed herein. In the stated figure, generally cylindrical coil 28 may be seen positioned below workpiece 10 in a relationship similar to that between flat coil 22 and the workpiece shown in FIGURE 2. The laminated core 26 is situated within coil 28 and is provided with a double beveled or wedge shape at one extremity thereof as indicated by reference numeral 30 in FIGURE 5. The use of a core arranged in the configuration and relationship shown, for example, by core 26 in FIGURE 5 tends to collimate or focus the lines of flux emanating from coil 28 in the region of workpiece 10 whereby movement of the workpiece across the top of the core toward the left or the right as seen in FIGURE 5 results in improved delineation of the pattern formed on the coated surface of workpiece 10 by the particles acting thereon. Depending upon the size of workpiece and the area upon which magnetic printing is to occur, only momentary exposure of the workpiece to the magnetic field generated by coil 28 and core 26 is necessary. The period of exposure in the case of parts having low mass such as honeycomb panels may be less than one second, with sufficient delineation of the printed pattern resulting during this brief period. As a result of this feature, the inventive process disclosed herein is adaptable for use with power units of conventional type capable of providing high current flow such as 2000 a. or more for extremely short duration without resulting in burnout of the coil or other circuit components. The stated feature also renders the inventive process amenable for use with workpieces of substantial mass requiring higher current flow and stronger magnetic fields than that permitted by conventional magnetic inspection methods wherein such flow must be continuously maintained over a substantial period, involving commensurately greater risk of overheating or burnout.

It is also an important feature of the inventive method disclosed herein that improved results are achieved by introducing a diamagnetic element of suitable material between the magnetic source and the workpiece to which the flux field is applied. The selection of such material depends upon its magnetic properties, and illustratively aluminum has been found to produce the desired result. The material should be of the type which interrupts the unidirectional path of lines of magnetic flux emanating from coil 22, 28 or core 26 and causes localized dispersion of such lines. Further illustrative of materials having the necessary properties are beryllium, carbon, copper and bismuth. In practicing the novel method disclosed herein, a sheet of material of the stated type such as 24ST aluminum alloy may be placed in operative relationship between coil 22 and workpiece 10, or alternatively, a bar of the stated material may be passed from one side to the other over the coil during the application of magnetic force to panel 10 by the coil as indicated by element 32 shown in FIGURE 5. The effect of this action is to accelerate the agitation of the magnetic particles on workpiece 10 whereby the printing action thereof on layer 19 is accelerated and improved delineation of the printed pattern results.

Figure 4:
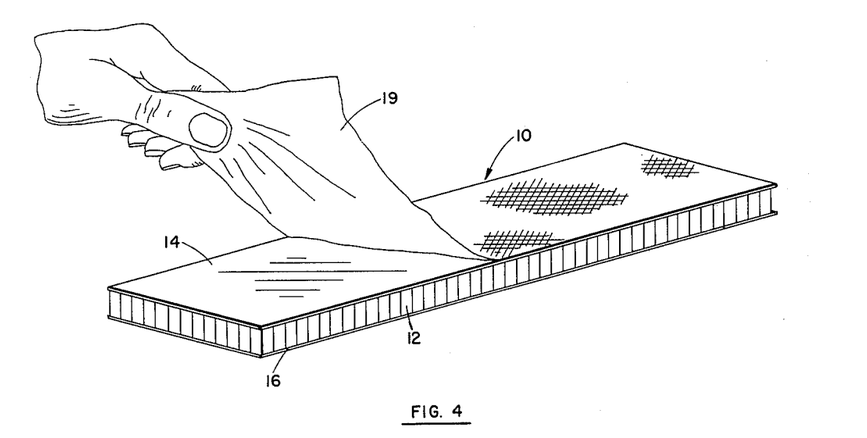
FIGURE 4 shows a perspective view of a permanent record of the magnetic inspection accomplished as shown by FIGURES 1 through 3 being removed from the stated workpiece.

Following completion of the printing process by brief exposure of workpiece 10 to a magnetic field as discussed above, the current through coil 28 may be terminated or the workpiece otherwise removed from the magnetic field, after which the magnetic particles may be dumped or otherwise removed from layer 19 by appropriate means such as inverting panel 10. The printed pattern resulting from the procedure discussed above may then be studied in detail while still attached to the workpiece, or the coating material may be removed by stripping in one continuous sheet as shown by FIGURE 4 if the strippable vinyl illustratively disclosed above is employed in practicing the inventive method disclosed herein. Prior to removal of the stated strippable coating, the printed surface may be sprayed or otherwise coated with a clear quick-drying solution such as clear vinyl lacquer which will serve to protect the printed impression on the initial vinyl coating and prevent smudging or similar adverse effects on the pattern. If for any reason it becomes desirable to repeat the printing step discussed above before removal of the strippable coating from the workpiece, the printed pattern thereon may be erased by wiping the coating surface of the workpiece with a cloth, dry sponge or similar means. With the coated surface thus cleaned, the printing step described above may be repeated. The cleaning and reprinting technique thus described may be repeated indefinitely on the same coated workpiece as the printed pattern is easily cleaned until fixed permanently by an overlying coat of clear lacquer as mentioned above.

Figure 6:
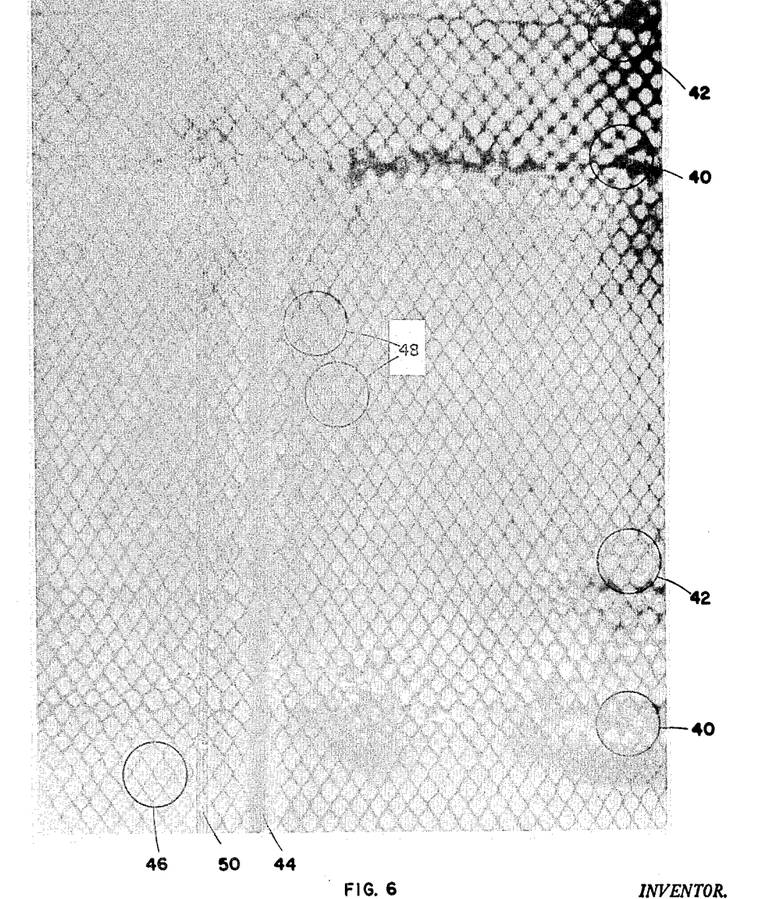
FIGURE 6 shows a printed record of the results of the magnetic inspection accomplished by the steps illustrated in FIGURES 1 through 5.

FIGURE 6 shows an example of a printed pattern resulting from use of the inventive method disclosed herein on a workpiece comprising a lightweight panel having a honeycomb core of thin metallic foil with a face sheet brazed to either side of the core. In the fabrication of such panels, a section of core material such as indicated at 12 in FIGURE 1 is initially cut to the desired thickness and size, and overlaid on either side with a thin sheet of brazing alloy in foil form. In contacting relationship with the brazing alloy foil on either side of the core material, metallic sheets 14 and 16 are placed whereby the application of heat in a sufficient amount will cause the brazing alloy to liquify or melt and to form fillets adjacent the lines of contact between the honeycomb cell walls and the stated sheets to join the same securely together when the brazing alloy solidifies upon cooling. Due to capillarity characteristics of the brazing alloy, the maximum gap between structural elements which are sought to be joined by this method is .040 inch. Thus, where an excessive gap occurs as indicated at 34 in FIGURE 9, a bead 36 of brazing alloy may form in the general location of a cell wall 38 of the honeycomb core material 12, but the surface tension thereof when the alloy is in the liquid state will not permit contact of the bead with the confronting edge of the cell wall. In consequence of the gap shown by FIGURE 9, if the stated condition occurs with excessive frequency throughout a panel workpiece, weak and structurally unsafe panel will result. This condition of defective joinder between core material 12 and face sheets 14 or 16 will not be detected by conventional X-ray or magnetic inspection means, since such means are either unsuited for honeycomb panel inspection or else the patterns produced therefrom are too fuzzy or too foggy to define with particularity the cell walls, the fillets adjacent thereto, or any useful indication of the gap between cell wall edge and face sheet surface where such gap occurs. The pattern from X-ray inspection may reveal the presence of a brazing alloy bead at the general location of the cell walls without providing an indication that the bead thus formed is not attached to the cell wall.

Figure 9:
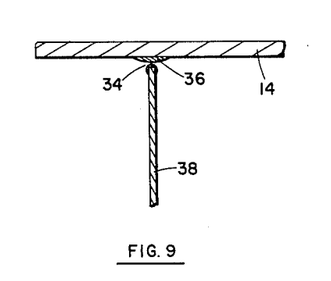
Figures 10, 11:
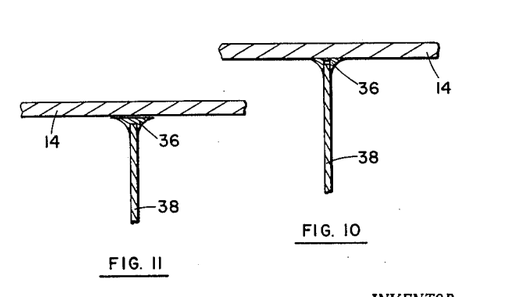

Other types of defects in brazed joints between honeycomb cell wall edges and face sheet surfaces in panels such as described above may be seen from FIGURES 10 and 11. Both stated figures show defects resulting from failure of the brazing alloy to form a normal joint with one or the other of the two components sought to be joined. Failure to form a normal attachment between the brazing alloy and the workpiece component surface may result from various causes such as oxidation of the surface or films and impurities of various types remaining on the surface due to insufficient cleaning or other preparation for the brazing process. Thus, FIGURE 10 shows brazing alloy 36 forming a secure bond or joint with face sheet 14 and embracing cell wall 38 without adhering thereto, while FIGURE 11 shows brazing alloy 36 securely joined to cell wall 38 but failing to adhere to face sheet 14. Defective joints between core material and face sheets as described above have no holding strength whatsoever to prevent separation of the panel components when the workpiece is subjected to external loads, and none of the stated defects is detectable by conventional inspection methods. However, the novel inspection method disclosed herein has been found extremely effective in revealing the defects discussed above and illustrated in FIGURES 9, 10 and 11 as well as many other defects not specifically treated herein.

Figure 12:
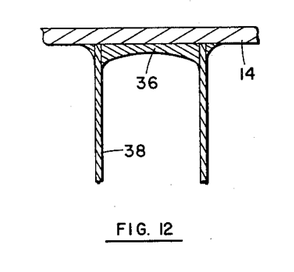

A further type of defect causing occasional difficulty in fabrication of brazed panels such as those discussed herein is shown by FIGURE 12. This type of defect is related to the phenomena whereby brazing alloy foil of constant thickness which is initially distributed uniformly throughout the panel workpiece, upon becoming liquid due to application of brazing heat, occasionally becomes concentrated in localized areas resulting in oversized fillets or in the formation of puddles of excess alloy which may occasionally cover completely the face sheet internal surface situated between the walls of a single cell as shown by FIGURE 12. This concentration of brazing alloy may occur in a single isolated cell or in groups of cells over a localized area.

Evidence of the various defects discussed above and illustrated in FIGURES 9 through 12, in addition to other defects, may be seen from the example of inspection test results shown in FIGURE 6. FIGURE 6 is a printed copy of a layer 19 taken from a honeycomb panel workpiece subjected to the process illustrated in FIGURE 5, tested by use of a vinyl layer having the composition set forth above and red iron oxide particles, and further using 1600 a. of alternating current at 60 c.p.s. for 6 seconds duration. Thus, for example, reference numeral 40 denotes an area of excessive brazing alloy forming puddles between the cell walls as shown in FIGURE 12, while reference numeral 42 denotes a zone of partial puddling wherein incomplete coverage of the panel face sheet area occurs between the cell walls, the effect of which is to produce oversized fillets. Also, an elongated zone wherein attachment of the cell walls to the face sheet has not occurred may be seen from FIGURE 6 and is designated generally by reference numeral 44. Zone 44 apparently resulted from excessive gap between cell walls and the face sheet as shown by FIGURE 9, and was caused perhaps by partial crushing of the delicate core material during assembly of components before the brazing heat was applied. Several isolated instances of defective joints between cell wall edges and face sheet surfaces are indicated in FIGURE 6 by reference numerals 46 and 48. The area designated 46 reflects the condition shown by FIGURE 10, while 48 designates a condition such as that shown by FIGURE 11. The generally vertical line denoted by reference numeral 50 in FIGURE 6 results from a welded joint between two metallic sheets which have been welded together to form a single face sheet such as sheet 14 in FIGURE 1 in the panel upon which the novel inspection method disclosed herein was practiced to produce the pattern shown in FIGURE 6.

Figure 7:
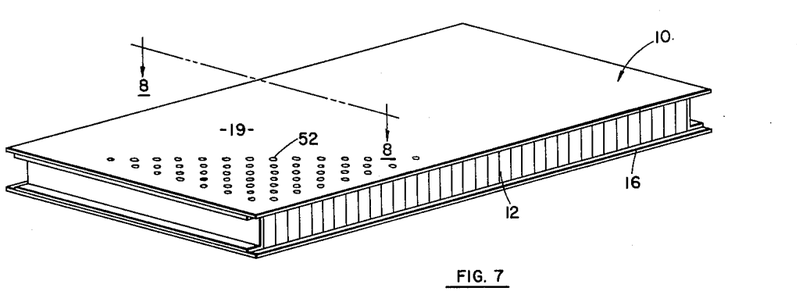
FIGURE 7 shows a panel workpiece after processing by the steps illustrated in FIGURES 1 through 5 as applied to a fabrication step in making holes through a panel face sheet.
Figure 8:
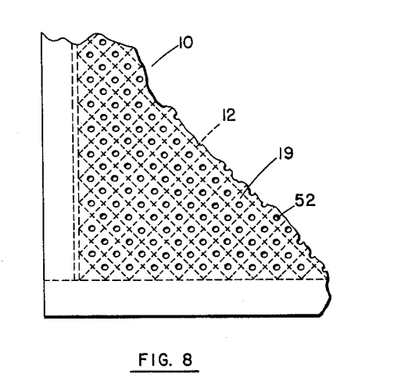
FIGURE 8 shows an isolated plan view of a portion of the workpiece shown in FIGURE 7, FIGURES 9, 10, 11 and 12 show isolated cross-sectional views taken through a face sheet and related portions of cell walls in the honeycomb core of the panel shown by FIGURES 1 through 8, illustrating different brazed joint defects which may occur in a single workpiece.

Use of the inventive method disclosed herein in connection with fabrication of a workpiece is illustrated by FIGURES 7 and 8. Thus, in connection with use of honeycomb panels on surfaces of high speed aerial or space vehicles at locations wherein boundary layer airflow is involved, it is necessary to provide panels of the stated type with a plurality of minute holes 52, each of which is centered with respect to the cell walls formed by the honeycomb core material in the panel. To locate accurately the precise center of each individual cell on the opposite side of the face sheet from which drilling is necessarily accomplished, the workpiece to be drilled is subjected to the novel method discussed above to produce a pattern on the coated surface thereof generally similar to the pattern shown by FIGURE 6. The printed pattern on the coating is appropriately treated with clear lacquer or other media to prevent smudging of the same, and remains affixed to the workpiece surface during the drilling operation. The precise location of each cell wall is obvious to the drilling operator by visually observing the printed pattern on the panel external surface. In the absence of the novel method disclosed herein, conventional methods for obtaining permanent records of inspection results in workpieces such as described above, even if precise delineation of cell walls could be achieved, would entail removal of film, paper, or other media from the workpiece in order to process the same, after which accurate correlation of the film or paper with the original workpiece to determine the exact location of cell walls shown on the record would be virtually impossible.

The inventive method disclosed herein has been found effective in connection with many different metals and alloys, including those having no residual magnetism, and workpieces of diverse sizes and shapes. Also, when the inspected object is not freely accessible for bench testing in a fixture, the method taught herein permits inspection or analysis of the object while installed in place, such as a honeycomb panel installed on a supersonic aerial or space vehicle. Thus, for example, a panel of the stated type may be mounted and affixed in the vehicle frame, and the more accessible face sheet surface on such panel may be coated with a printable layer as described above. A portable source of magnetic force may be used to create a localized fluctuating magnetic field which may then be moved over the entire panel surface proximate the face sheet opposite from the coated one to produce the desired printing action on the printable layer. The particles for producing the printed impression under the influence of the magnetic field may first be dispersed over the surface of a suitable supporting member such as a velvet cloth or a bed of loosely combed cotton or the like. The cloth or other flexible and magnetically porous supporting member may then be held against or in close proximity with the coated workpiece surface while the magnetic field is created and the magnetic source is moved over the desired path, resulting in the printing action on the painted surface all as described more particularly hereinabove without loss of the particles such as might otherwise occur due to the effects of gravity. In conjunction with the foregoing procedure, a diamagnetic material such as an aluminum bar may be momentarily interposed between the magnetic source and the workpiece to enhance particle movement as mentioned above in connection with FIGURE 5.

Figure 13:
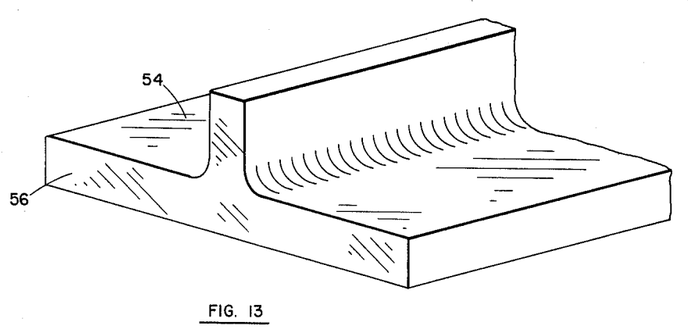
FIGURE 13 shows an isolated perspective view of a workpiece having the form of an extruded panel member of inverted T cross-section.

Application of the inventive principles disclosed herein to determine the metallurgical configuration of metallic specimens is illustratively shown by FIGURES 13 through 16. FIGURE 13 shows a channel member 54 of material such as PH15–7Mo alloy having a composition specified hereinabove and fabricated by an extrusion process to form a channel of generally T-shaped cross-section. Raw material of the stated type is normally received from the rolling mill or other source in the annealed condition whereby austenitic structure is normally achieved throughout the member. In extruded parts such as channel member 54 shown in FIGURE 13, ductility is normally desired in order to facilitate fabrication of parts from the raw material. In the so called advanced alloy materials such as PH15–7Mo, a phenomena known as segregation occasionally occurs whereby a constituent element such as nickel or chromium fails to diffuse uniformly throughout the matrix for various reasons and differences in composition of the specimen on a microscopic scale sometimes result. Where such differences occur, application of heat to anneal the specimen sometimes produces a uniformly austenitic structure by diffusing the segregated element in the metallic solution. However, the rate of such diffusion depends upon the nature of the segregation and the precise element involved, and the diffusion rate for nickel or chromium, for example, is relatively lower than that associated with other elements in the precipitation hardenable alloy illustratively specified hereinabove. Moreover, some kinds of segregation or of particular elements do not respond to normal annealing processes and require higher temperatures and longer dwell times to produce diffusion. However, higher temperatures than those associated with annealing usually have an extremely deleterious effect upon the final physical properties of the specimen, resulting in rejection of the finished part.

Due to the necessity for determining that raw material or workpiece components such as channel 54 in FIGURE 13 are uniformly austenitic in structure throughout, a sample of such material is normally selected from a large quantity of billets or parts and subjected to appropriate inspection tests. Thus, a cross-sectional cut may be made through channel member 54 and the resulting surface 56 may be coated with a suitable agent such as the vinyl paint discussed hereinabove to prepare the test specimen for inspection. In contrast to the conventional methods for metallurgical inspection by etching, surface 56 of member 54 need not be finely polished or otherwise machined prior to inspection by the novel method disclosed herein. In practicing the stated method on channel member 54 the stated member after being coated on surface 56 as mentioned above is placed within a coil in the general manner shown by placement of coils 28 around core 26 in FIGURE 5, although the workpiece may be situated in various other relationships with a source of magnetic force depending upon the precise size and shape of the coil or the workpiece. With channel 54 appropriately placed so that lines of flux will penetrate surface 56 substantially perpendicular thereto, magnetic particles such as discussed above may be dusted onto surface 56 before or during the application of magnetic force to produce the flux field. Following removal of the magnetic particles from surface 56, a coating of clear lacquer may optionally be applied to surface 56 to prevent smudging of the resultant pattern, and the printed pattern may be peeled from surface 56 for detailed study as required. The vinyl paint discussed above is advantageous in facilitating the inspection process by reason of the fact that the printed pattern thereon may be reproduced on standard photographic sensitized paper using the vinyl strip as a negative. A copy of the pattern thus obtained from a specimen such as channel 54 in FIGURE 13 may be seen from FIGURE 15. The pattern was obtained from an extruded channel of PH15–7Mo material and the test conditions included exposure of the specimen to a magnetic field produced by 1200 a. of pulsating direct current at 60 c.p.s. for 5 seconds.

Figures 15, 16:
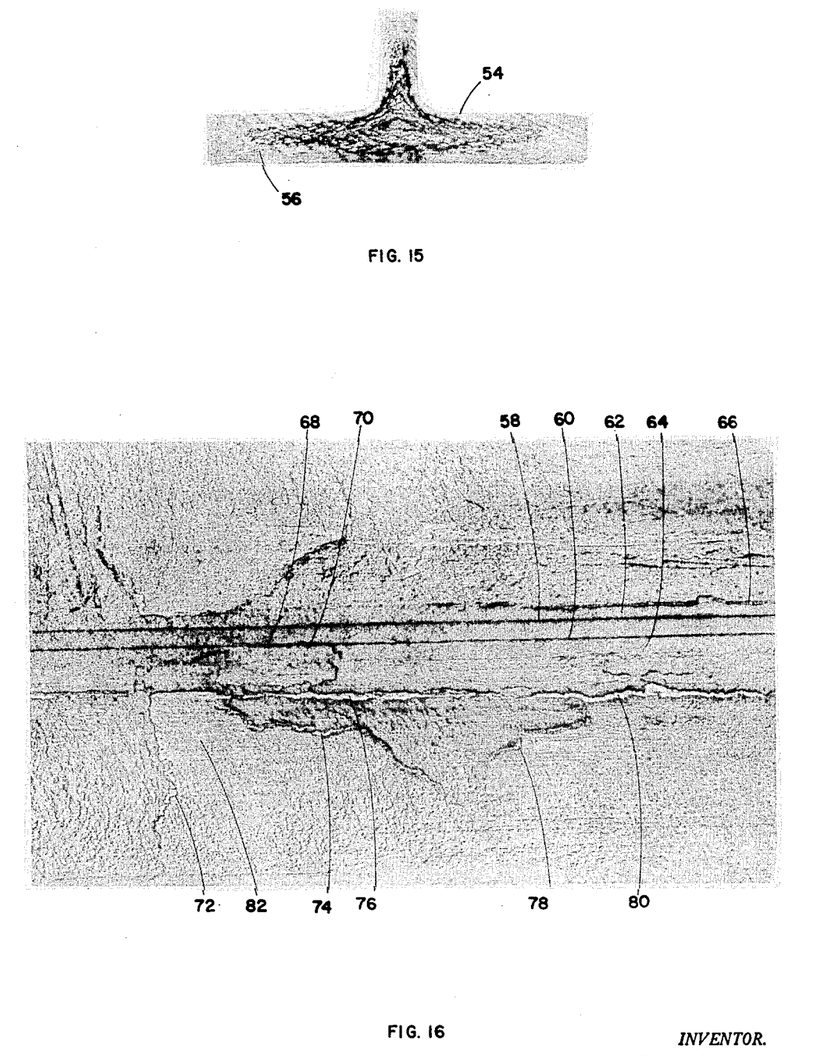
FIGURE 15 shows a permanent record of the metallurgical inspection results from the workpiece shown in FIGURE 13 obtained from the novel method disclosed herein.
FIGURE 16 shows a permanent printed record of the results from the novel method disclosed herein practiced on a workpiece of the type shown in FIGURE 14.

As seen from FIGURE 15, the metallurgical condition of member 54 shown in FIGURE 13 includes a relatively light area denoting an austenitic condition near the surface of the member, while a relatively darker generally T-shaped area corresponding to the overall shape of the member lies near the center thereof. The darker area thus referred to denotes a precipitation hardened condition which may have resulted from any one of several possible causes. The printed record thus shown in FIGURE 15 reveals an extreme state of segregation wherein the annealed workpiece has an austenitic layer near the surface and a predominately martensitic structure throughout most of the workpiece material and generally centered thereon. Moreover, detailed evaluation of the printed pattern from a metallurgical inspection test accomplished in accordance with the inventive principles taught therein by a metallurgist skilled in this technique can provide many clues relative to the cause of various abnormalities revealed by the inspection procedure, as well as indicating various methods for correcting or eliminating the defects thus revealed. For example, the condition shown by FIGURE 15 was not corrected by annealing the test specimen at elevated temperatures, from which it may be assumed that the abnormal condition involves segregation of nickel or chromium, while the nature of the pattern tends to indicate that the abnormality did not result from the extrusion process but must have existed in the billet from which the extrusion was initially formed. The extremely detailed and well defined pattern in FIGURE 15 includes shadings, lines or shadows indicating various metallurgical or microscopic details, the complete evaluation of which depends upon the skill and experience of the technician interpreting the test results. It suffices herein to point out that detailed information such as shown by FIGURE 15 has not been available to metallurgists by use of any method heretofore known to the prior art and suitable for mass production use.

Figure 3:
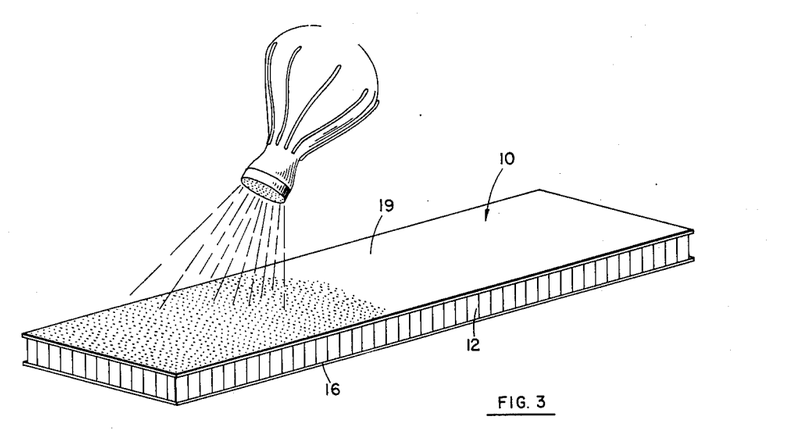
FIGURE 3 shows particles responsive to a magnetic field being applied to the workpiece of FIGURES 1 and 2 in accordance with another step in the novel method disclosed herein.
Figure 14:
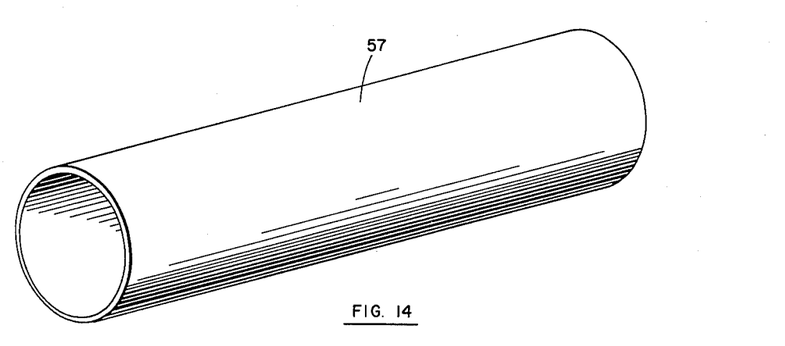
FIGURE 14 shows a tubular workpiece having a welded seam longitudinally directed along one side thereof.

A further example of the inventive principles taught herein as applied to metallurgical inspection of raw materials or workpiece components is illustrated by welded seam tubing specimen 57 of FIGURE 14 which may be coated with a suitable agent such as the vinyl paint disclosed hereinabove and exposed to a flux field after dusting with a paramagnetic particulate in the manner generally shown by FIGURES 1 through 3 and discussed above. A sample copy of a printed record thus obtained from a tubular specimen of AM350 material is shown in FIGURE 16. AM350 is an advanced steel alloy composed generally as follows:

Percent Approximate:
```
    Carbon ______________________________ 0.10
    Nickel ______________________________ 4.2
    Chromium ___________________________ 17.0
    Molybdenum _________________________ 2.8
    Iron ________________________________ Balance
```

The tubular specimen from which the printed record of FIGURE 16 was obtained had a smooth and highly polished or mirror-like appearance from which no discontinuities of structure or composition were apparent to the naked eye. In addition to the ease and rapidity of the novel process disclosed herein inspecting workpieces such as that shown in FIGURE 14, it may be seen from FIGURE 16 that the effectiveness of the novel method in disclosing metallurgical structure is amazing in its detail and its scope. Thus, for example, the generally horizontal parallel lines 58 and 60 in FIGURE 16 define a weld seam on the surface of tubing 57 and which is invisible in the polished tube specimen, while reference numerals 62 and 64 of FIGURE 16 denote the workpiece material adjacent the stated seam on either side thereof and known generally as the heat affected zone. The workpiece area designated 62 and 64 includes that portion of the workpiece material situated adjacent the welding path and the temperature of which is raised so high during the application of welding heat as to affect adversely the physical properties of the stated zone. Since the base metal in the workpiece beyond the heat affected zone is relatively much cooler during the welding process, post-weld shrinkage of metal in the weld seam and the heat affected zone is considerable, while that occurring in the relatively cooler base metal is negligible or totally absent. As a result of the stated condition of differential shrinkage, a line or plane of incipient failure due to residual stress created between the stated portions of workpiece material occasionally results. As example of this defect is indicated by reference numeral 66 in FIGURE 16 designating a microscopic plane of weakness or incipient failure which is so minute as not to be revealed by conventional inspection methods. Further defects in the workpiece as revealed by FIGURE 16 are indicated by reference numerals 68 and 70 which designate portions of the weld seam wherein fusion was incomplete or otherwise formed a defective joint due to impurities, oxidation or other deleterious conditions in the zone of fusion. Local pockets or veins of retained austenite in the martensitic material forming the tubular specimen under discussion are also revealed by the record shown in FIGURE 16 and are designated by reference numerals 72, 74, 76, 78 and 80. Based upon the superior physical properties of steel in the martensitic state compared with those associated with austenitic steel, the stated localized areas of retained austenite constitute potential zones of failure which, if uncorrected would normally require rejection of the workpiece.

Many other microscopic and metallurgical details in the composition and structure of the workpiece inspection record shown by FIGURE 16 are provided by the inventive method disclosed herein. Thus, for example, the zone generally designated by reference numeral 82 in the stated figure shows the granular direction of the metal to be generally horizontal in FIGURE 16, a feature which is similarly reflected by lines and shadows in many other portions of the printed pattern shown by the stated figure. Many other details not specifically treated herein are also revealed by the stated test results, and provide much useful information for evaluation by a skilled technician.

Figure 17:
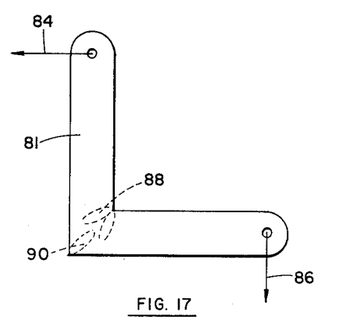
FIGURE 17 shows an illustrative example of the novel method disclosed herein used for determining stress patterns in a specimen to which external loads are applied.

The inventive principles taught herein are further applicable to the study of stress patterns produced in specimens by the application of external loads thereon as illustrated by FIGURE 17. In the stated figure, a generally L-shaped specimen 81 is shown with arrows 84 and 86 denoting the direction in which two external loads are illustratively applied to specimen 81. Dotted lines 88 and 90 represent areas of stress within the workpiece material produced by the application of force in the stated manner. The areas of stress 88 and 90 may be revealed by coating specimen 81 with a suitable agent such as the vinyl paint discussed above, and dusting the specimen with metallic particles before or during the application of magnetic force to produce flux lines generally perpendicular to the coated surface of the specimen. The intensity of shading in areas of concentrated stress in a workpiece thus treated varies with respect to the shading in areas of the coated surface reflecting an absence of stress.

Figures 18, 19:
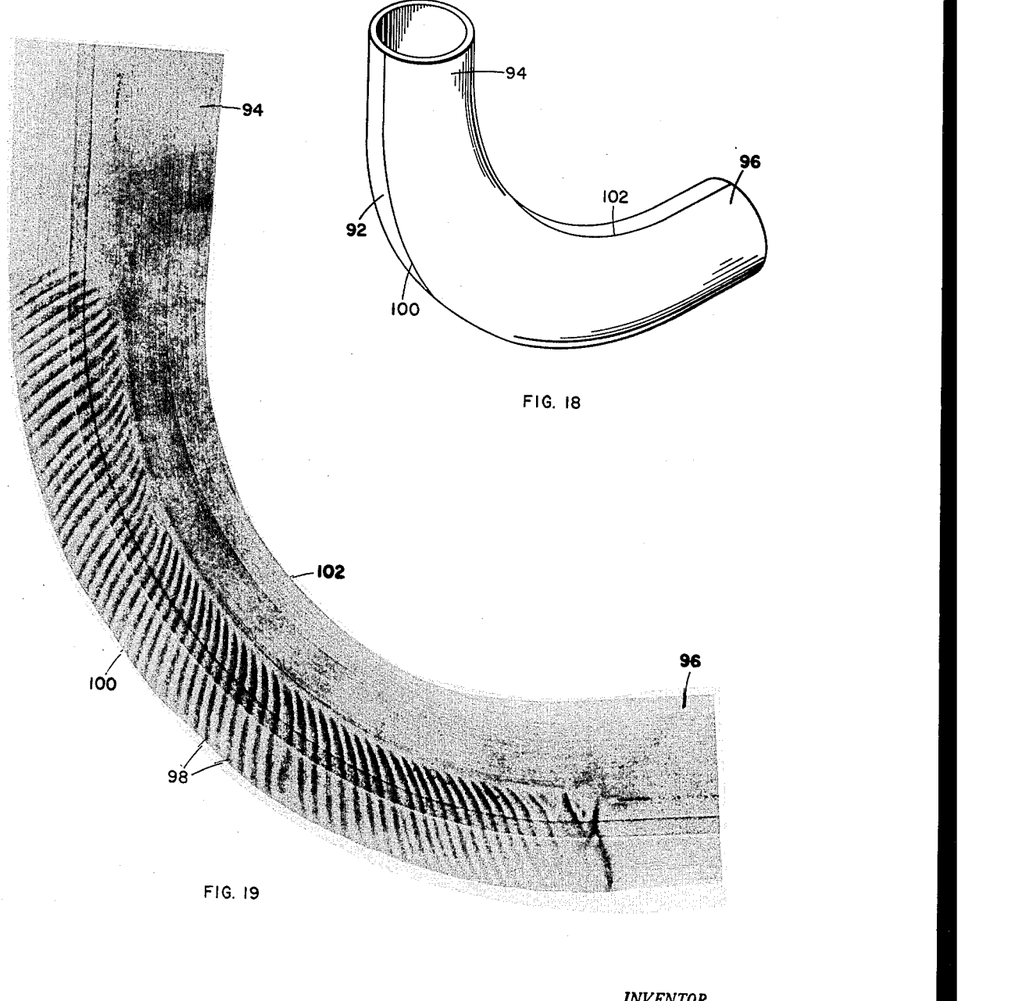
FIGURE 18 shows a perspective view of a tubular seam welded workpiece after being bent into a curved shape from an initially straight condition.
FIGURE 19 shows a permanent record of the residual stress pattern resulting in a workpiece similar to that shown in FIGURE 18 as revealed by the novel resolving method disclosed in the instant case.

The inventive principles taught herein regarding stress patterns discussed above are further illustrated by FIGURES 18 and 19. FIGURE 18 shows a short length of curved tubing 92 such as may be produced by bending a straight section of tubing approximately 90 degrees. Tube bending of the stated type is usually accomplished by securely gripping one end of the straight tube section such as end portion 96 and workpiece 92 and pulling the stated end in an arcuate path corresponding generally to the curvature of a round center post against which the workpiece is held in continual contact by force applied at end 94.

FIGURE 19 shows a photographic print made from a strippable vinyl coat obtained from a tubing specimen such as described in connection with FIGURE 18 and fabricated from an advanced alloy of stainless steel similar to those described hereinabove. Residual stress in the tube resulting from the bending process is clearly apparent from the printed record of FIGURE 19 as shown by the relatively dark shaded stripes 98 separated by lighter stripes. It will be understood by those familiar with the tube bending art that the outer radial portion 100 of the curved tubing specimen 92 is in tension while the inner radial portion 102 is primarily in compression. The characteristic sweep of the shaded stripes 98 is due to the fact that relatively greater tension occurs at the outer radial portion of the tubing during bending than that occurring at the top and bottom center areas along the tube, whereby stripes 98 are wider along the area designated by reference number 100 in FIGURE 19 than along the line midway between areas 100 and 102. Moreover, elongation of the material in workpiece 92 is necessarily greater near the outer radius of curvature than along the inner radius, with the result that stripes 98 are closer together as the inner radius of curvature is approached.

While the particular details of the structures and methods set forth above and shown in the drawings are fully capable of achieving the objects and providing the advantages herein stated, the details thus disclosed are merely illustrative and could be varied or modified to produce equivalent results without departing from the scope of the inventive concept as defined in the appended claim.

I claim.

In fabrication of a metallic workpiece having a first portion of structure obscured from view by a second portion of structure affixed to said first portion, wherein removal of material from precise locations on said second portion is necessary without damage to said first portion; the method comprising providing a layer of printable material on an exposed surface of said second portion, said material being adapted to receive a printed impression from a paramagnetic particulate, depositing said particulate in close proximity with said layer, exposing said workpiece and said particulate to a magnetic field of fluctuating intensity to cause said particulate to impinge said layer and leave a printed impression thereon delineating the structural configuration of said first portion of structure with respect to said second portion of structure, and thereafter removing said workpiece from said field and said particulate from said layer, and removing said material from said precise location on said second portion according to the delineation shown by said printed impression.

References Cited by the Examiner

UNITED STATES PATENTS

| | | | |
|---|---|---|---|
| 2,455,874 | 12/1948 | Newman | 324—38 |
| 2,933,679 | 4/1960 | Bray | 324—41 |
| 2,965,959 | 12/1960 | Horne et al. | 29—407 |

OTHER REFERENCES

"New Magnetic Test Includes Stainless Steel" (Maxwell Pevar), Product Engineering, vol. 32, No. 6, Feb. 6, 1961, pp. 41–43.

WHITMORE A. WILTZ, *Primary Examiner.*